(12) United States Patent
Bombet et al.

(10) Patent No.: US 7,984,200 B1
(45) Date of Patent: Jul. 19, 2011

(54) CONFIGURING A DATA STORAGE DEVICE WITH A CONFIGURATION DATA RECORD SET IN RESPONSE TO A CONFIGURATION CODE

(75) Inventors: Marc A. Bombet, Trabuco Canyon, CA (US); Michael S. Rothberg, Foothill Ranch, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 273 days.

(21) Appl. No.: 12/253,832

(22) Filed: Oct. 17, 2008

Related U.S. Application Data

(63) Continuation-in-part of application No. 12/236,278, filed on Sep. 23, 2008.

(51) Int. Cl.
  G06F 3/00 (2006.01)
  G06F 13/00 (2006.01)
  G06F 15/177 (2006.01)

(52) U.S. Cl. .................. 710/8; 710/10; 711/170; 713/1; 713/2

(58) Field of Classification Search .................... None
See application file for complete search history.

(56) References Cited

U.S. PATENT DOCUMENTS

| | | | |
|---|---|---|---|
| 5,440,716 A | 8/1995 | Schultz et al. | |
| 5,515,524 A | 5/1996 | Lynch et al. | |
| 5,682,513 A * | 10/1997 | Candelaria et al. | 711/113 |
| 5,996,027 A | 11/1999 | Volk et al. | |
| 6,247,128 B1 | 6/2001 | Fisher et al. | |
| 6,301,696 B1 * | 10/2001 | Lien et al. | 716/116 |
| 6,862,704 B1 * | 3/2005 | Miner | 714/718 |
| 6,895,500 B1 * | 5/2005 | Rothberg | 713/1 |
| 7,024,614 B1 | 4/2006 | Thelin et al. | |
| 7,058,759 B1 | 6/2006 | Reiser et al. | |
| 7,106,541 B2 | 9/2006 | Bruner et al. | |
| 7,188,330 B2 * | 3/2007 | Goyal | 716/104 |
| 7,289,291 B1 | 10/2007 | Schlumberger | |
| 7,555,570 B2 * | 6/2009 | Hickey et al. | 710/8 |
| 2003/0115297 A1 * | 6/2003 | Branson et al. | 709/220 |
| 2004/0059537 A1 * | 3/2004 | McIntosh et al. | 702/120 |
| 2004/0088367 A1 | 5/2004 | Reinke | |
| 2005/0177829 A1 | 8/2005 | Vishwanath | |
| 2005/0195515 A1 * | 9/2005 | Bruner et al. | 360/69 |
| 2005/0240686 A1 | 10/2005 | Kashiwagi | |
| 2005/0273549 A1 * | 12/2005 | Roohparvar | 711/103 |
| 2006/0031454 A1 * | 2/2006 | Ewing et al. | 709/223 |
| 2006/0200262 A1 | 9/2006 | Dyer | |
| 2006/0252522 A1 * | 11/2006 | Walker et al. | 463/29 |
| 2008/0010685 A1 * | 1/2008 | Holtzman et al. | 726/27 |
| 2008/0045177 A1 * | 2/2008 | Wise | 455/403 |
| 2008/0256406 A1 * | 10/2008 | Arnold | 714/727 |
| 2008/0313628 A1 * | 12/2008 | Justus et al. | 717/172 |
| 2009/0213655 A1 * | 8/2009 | Roohparvar | 365/185.05 |

OTHER PUBLICATIONS

U.S. Appl. No. 12/236,278, filed Sep. 23, 2008, 23 pages.

(Continued)

*Primary Examiner* — Henry W Tsai
*Assistant Examiner* — Michael Sun

(57) ABSTRACT

A method is disclosed for configuring a data storage device. The data storage device receives a configuration code, and in response to the configuration code selects a configuration data record set from a plurality of configuration data record sets. The data storage device is configured in response to the selected configuration data record set. For example, the data storage device may be configured into a manufacturing test procedure mode, and then into a customer specific operating mode. In another embodiment, a hardware configuration of the data storage device is identified, and the configuration code selected based on the identified hardware configuration.

18 Claims, 16 Drawing Sheets

OTHER PUBLICATIONS

Office Action dated Sep. 27, 2010 from U.S. Appl. No. 12/236,278, 15 pages.

Office Action dated Mar. 17, 2011 from U.S. Appl. No. 12/236,278, 17 pages.

* cited by examiner

GUI PARAMETER SETUP

| Feature/Parameter | Customer 1 | Customer 2 |
|---|---|---|
| ATA Security | | |
|   Supported | true | false |
| Offline Scan | | |
|   Supported | true | false |
|   Timer | 0400 | 0700 |
| Acoustic Management | | |
|   Enable | true | false |
|   Level | ◇ Performance Mode | ◇ Performance Mode / Quiet Mode / Factory Mode |
| Firmware Version | | |
|   Supported | true | false |
|   Version | "HP 10.6.7.00.1" | "DELL 10.6.7.00.1" |

FIG. 2

```
// Structure for 0x115 record          // Structure for 0x118 record
typedef struct                          typedef struct UINT32   signature;                     UINT16   feature_id;
UINT16   feature_id;                    UINT16   parameter_id;
UINT16   parameter_id;                  UINT16   parameter_type;
UINT16   parameter_type;                UINT16   parameter_length;
UINT16   parameter_length;              UINT16   actual_length;
VAR      parameter_value;               UINT8    feat_enabled;
                                        UINT16   file_section;
                                        UINT16   file_offset;
                                        UINT32   bit_number;
                                        UINT8    expected_value;
                                        UINT8    setting_no;
                                                 settints_per_feature;
```

// ** ATA Security *

{1, 1, BOOLEAN, LENGTH_BYTE, sizeof (CFG_DRV_LOCK), ENABLE, FM_CONFIG_DATA, PASSWORD_OFFSET, CFG_DRV_LOCK_OFFSET, PS_CAPABLE, 1, 1, 2}, {1, 1, BOOLEAN, LENGTH_BYTE, sizeof (CFG_AUTHENTICATION), ENABLE, FM_CONFIG_DATA, PASSWORD_OFFSET, CFG_AUTHENTICATION_OFFSET, PWEN, 1, 2, 2}, {1, 1, BOOLEAN, LENGTH_BYTE, sizeof (CFG_DRV_LOCK), DISABLE, FM_CONFIG_DATA, PASSWORD_OFFSET, CFG_DRV_LOCK_OFFSET, PS_CAPABLE, 0, 1, 2}, {1, 1, BOOLEAN, LENGTH_BYTE, sizeof (CFG_AUTHENTICATION), DISABLE, FM_CONFIG_DATA, PASSWORD_OFFSET, CFG_AUTHENTICATION_OFFSET, PWEN, 0, 2, 2}, // ** Offline Scan *

{2, 1, BOOLEAN, LENGTH_BYTE, sizeof (SMART_VAR_GEN_PURPOSE_FLAG), ENABLE, FM_DRM_PROTO_LOG, SECTION8_OFFSET, GPD_LSUBSECTION1_OFFSET, AUTO_OL_ENABLED_BIT, 1, 1, 1}, {2, 1, BOOLEAN, LENGTH_BYTE, sizeof (SMART_VAR_GEN_PURPOSE_FLAG), DISABLE, FM_DRM_PROTO_LOG, SECTION8_OFFSET, GPD_LSUBSECTION1_OFFSET, AUTO_OL_ENABLED_BIT, 0, 1, 1}, {2, 2, VALUE, sizeof (CFG_OFFLINE_TIMER) , sizeof (CFG_OFFLINE_TIMER), ENABLE, FM_CONFIG_DATA, BACKGROUND_OFFSET, CFG_OFFLINE_TIMER_OFFSET, UNRELATED, UNRELATED, 1, 1},

FIG. 4A

// ** Automatic Acoustic Management (AAM) **

{3, 1, BOOLEAN, LENGTH_BYTE, sizeof (CFG_ACMGTEN), ENABLE, FM_CONFIG_DATA, FEATURES_OFFSET, CFG_CONTROL_OFFSET, ACMGTEN, 1, 1, 1},
{3, 1, BOOLEAN, LENGTH_BYTE, sizeof (CFG_ACMGTEN), DISABLE, FM_CONFIG_DATA, FEATURES_OFFSET, CFG_CONTROL_OFFSET, ACMGTEN, 0, 1, 1}, {3, 2, ENUM, LENGTH_BYTE, sizeof (CFG_AC_LVL), ENUM(Perform_Mode, 1), FM_CONFIG_DATA, FEATURES_OFFSET, CFG_AC_LVL_OFFSET, BIT(0), 0, 1, 7},
{3, 2, ENUM, LENGTH_BYTE, sizeof (CFG_AC_LVL), ENUM(Perform_Mode, 1), FM_CONFIG_DATA, FEATURES_OFFSET, CFG_AC_LVL_OFFSET, BIT(1), 0, 2, 7},
{3, 2, ENUM, LENGTH_BYTE, sizeof (CFG_AC_LVL), ENUM(Perform_Mode, 1), FM_CONFIG_DATA, FEATURES_OFFSET, CFG_AC_LVL_OFFSET, BIT(2), 0, 3, 7},
{3, 2, ENUM, LENGTH_BYTE, sizeof (CFG_AC_LVL), ENUM(Perform_Mode, 1), FM_CONFIG_DATA, FEATURES_OFFSET, CFG_AC_LVL_OFFSET, BIT(3), 0, 4, 7},
{3, 2, ENUM, LENGTH_BYTE, sizeof (CFG_AC_LVL), ENUM(Perform_Mode, 1), FM_CONFIG_DATA, FEATURES_OFFSET, CFG_AC_LVL_OFFSET, BIT(4), 0, 5, 7},
{3, 2, ENUM, LENGTH_BYTE, sizeof (CFG_AC_LVL), ENUM(Perform_Mode, 1), FM_CONFIG_DATA, FEATURES_OFFSET, CFG_AC_LVL_OFFSET, BIT(5), 0, 6, 7},
{3, 2, ENUM, LENGTH_BYTE, sizeof (CFG_AC_LVL), ENUM(Perform_Mode, 1), FM_CONFIG_DATA, FEATURES_OFFSET, CFG_AC_LVL_OFFSET, BIT(6), 0, 7, 7}, {3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(0), 1, 1, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(1), 1, 2, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(2), 0, 3, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(3), 0, 4, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(4), 1, 5, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(5), 1, 6, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(6), 0, 7, 7}, {3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(0), 1, 1, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(1), 1, 2, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(2), 0, 3, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(3), 0, 4, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(4), 0, 5, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(5), 0, 6, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(6), 0, 7, 7}, // ** Firmware Version **

{4, 1, STRING, LENGTH_STRING, sizeof (FW_VERSION), ENABLE, FM_CONFIG_DATA, FIRMWARE_OFFSET, FW_SUPPORT_OFFSET, FWSUP, 1, 1, 1},
{4, 1, STRING, LENGTH_STRING, sizeof (FW_VERSION), DISABLE, FM_CONFIG_DATA, FIRMWARE_OFFSET, FW_SUPPORT_OFFSET, FWSUP, 0, 1, 1}, {4, 2, STRING, LENGTH_STRING, sizeof (FW_VERSION), UNRELATED, FM_CONFIG_DATA, FIRMWARE_OFFSET, VERSION_OFFSET, UNRELATED, 1, 1},

FIG. 4B

CONFIGURING A DATA STORAGE DEVICE WITH A CONFIGURATION DATA RECORD SET IN RESPONSE TO A CONFIGURATION CODE

CROSS REFERENCE TO RELATED APPLICATIONS

This application is a continuation-in-part of co-pending U.S. patent application Ser. No. 12/236,278, filed on Sep. 23, 2008.

BACKGROUND

Description of the Related Art

When manufacturing data storage devices, such as disk drives, each data storage device is typically configured according to the specifications of each individual customer (e.g., each PC manufacturer). For example, certain features may be enabled or disabled, or the disk drive may be configured to operate in various modes of operation, such as different security modes, different performance/acoustic modes, etc. Configuring the disk drive typically involves modifying configuration files stored in the disk drive. When a disk drive is powered on, the control circuitry reads the configuration files and configures itself accordingly.

In the past, a feature specification engineer has typically maintained a feature spreadsheet that specifies the features requested for each customer. From the feature spreadsheet a firmware engineer generates executable code for implementing each feature, wherein the executable code reads appropriate data from configuration files. For each customer, a configuration engineer typically creates a corresponding configuration spreadsheet that specifies how to initialize the configuration files to be stored on each disk drive. When a newly manufactured disk drive is powered on, the executable code reads the configuration files and configures the disk drive accordingly.

The above process is subject to human error since the configuration engineer may make input errors when generating the configuration spreadsheet such that the configuration spreadsheet is not compatible with the executable code. In addition, operator error may occur when the feature spreadsheet is modified and the modification does not propagate correctly to the configuration spreadsheet. If the configuration spreadsheet and corresponding configuration files are incorrect, it may lead to the recall of thousands of misconfigured disk drives.

BRIEF DESCRIPTION OF THE DRAWINGS

FIG. 2 illustrates an embodiment of the present invention wherein a graphical user interface is employed to generate the configuration data records.

FIG. 3A shows a configuration data structure according to an embodiment of the present invention.

FIG. 3B shows a configuration execution record according to an embodiment of the present invention.

FIGS. 4A and 4B show example configuration execution records in the form of a table in a ".h" file.

DETAILED DESCRIPTION OF EMBODIMENTS OF THE INVENTION

Figure 1A:
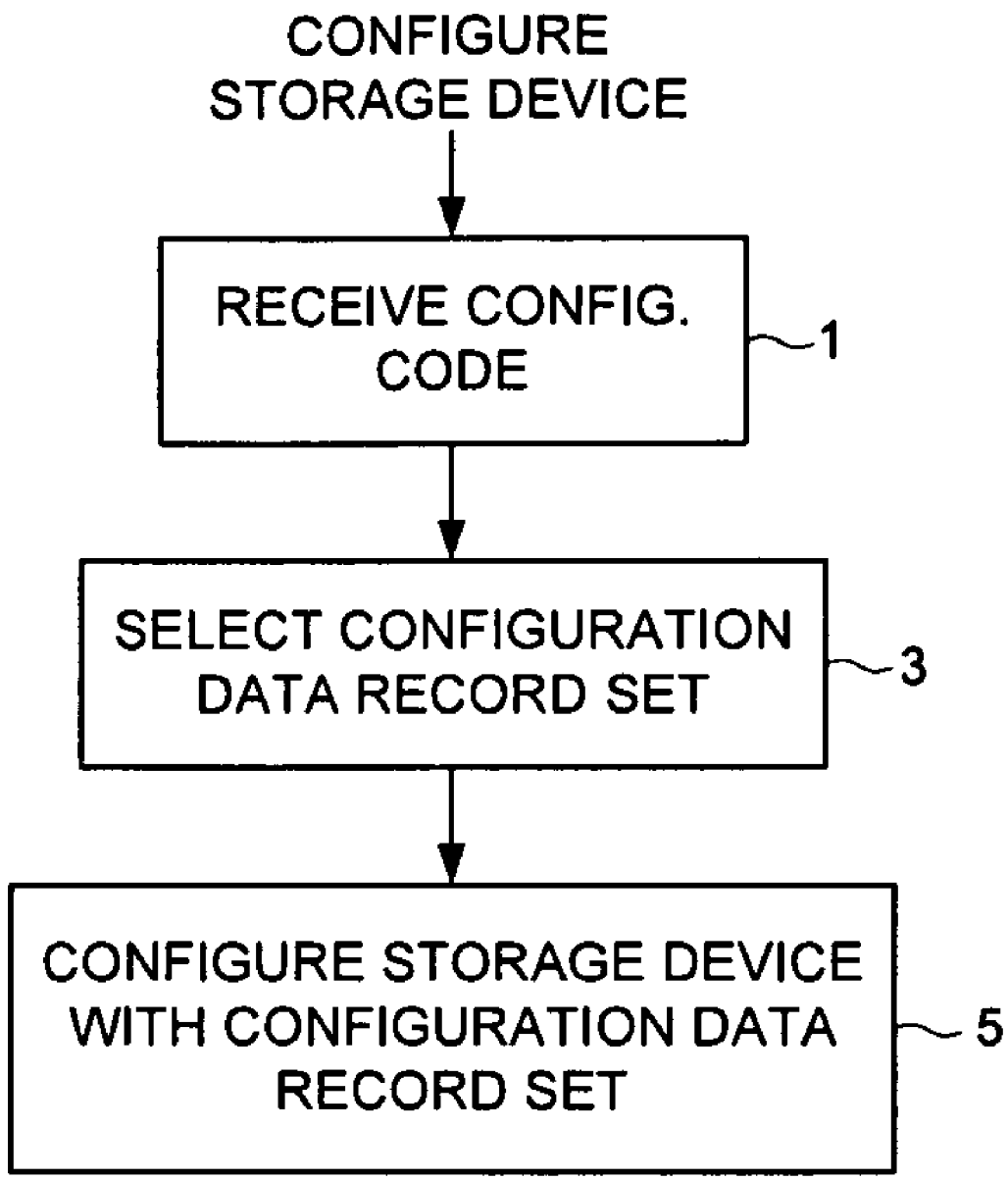
FIG. 1A shows a method according to an embodiment of the present invention for configuring a data storage device, such as a disk drive, with a configuration data record set in response to a configuration code.

FIG. 1A illustrates a method of configuring a data storage device, such as a disk drive, according to an embodiment of the present invention. The data storage device receives a configuration code (step 1), and in response to the configuration code selects a configuration data record set from a plurality of configuration data record sets (step 3). Each configuration data record set comprises a plurality of feature parameter settings The data storage device is configured in response to the selected configuration data record set (step 5) by configuring the feature parameters with the settings.

Figure 1B:
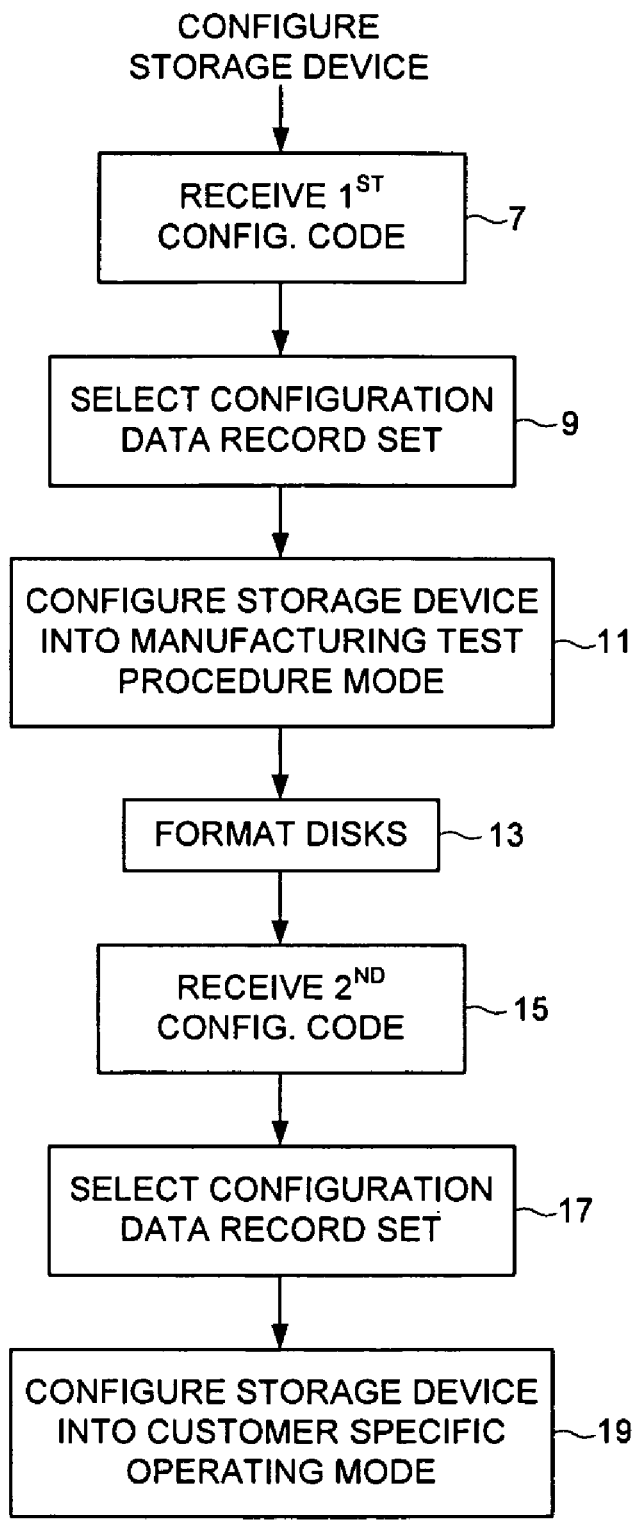
FIG. 1B shows a method according to an embodiment wherein the data storage device is configured into a manufacturing test procedure mode, and then into a customer specific operating mode.

FIG. 1B is a flow diagram according to an embodiment of the present invention wherein the data storage device receives a first configuration code (step 7), and in response to the first configuration code, selects a configuration data record set from a plurality of configuration data record sets (step 9) and configures the data storage device into a manufacturing test procedure mode (step 11). In one embodiment, the data storage device comprises at least one or more disks (e.g., a disk drive shown in FIG. 11). After executing the manufacturing test procedures, the disks are formatted with a suitable radial tracks per inch (TPI) and or linear bit density (step 13).

Thereafter, the data storage device receives a second configuration code (step 15), and in response to the second configuration code, selects a configuration data record set from the plurality of configuration data record sets (step 17) and configures the data storage device into a customer specific operating mode (step 19).

Figure 1C:
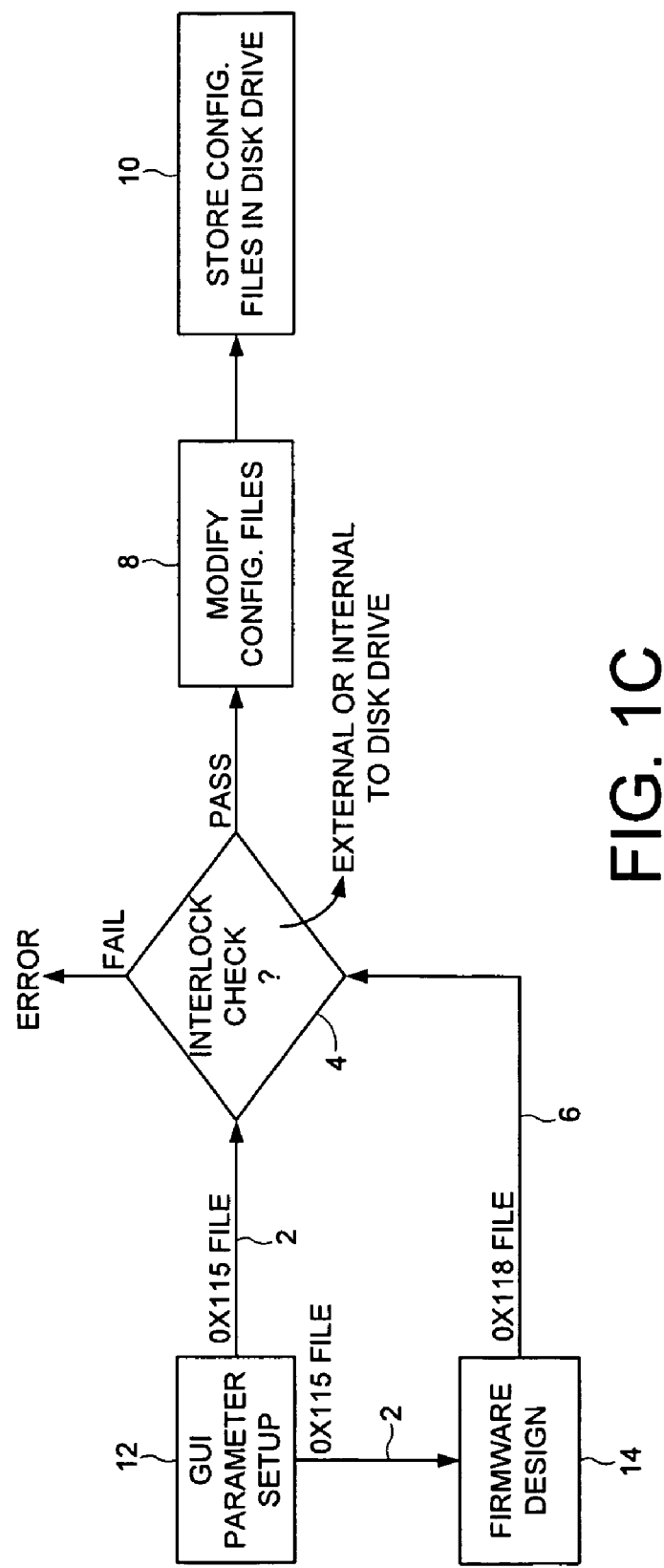
FIG. 1C illustrates a method according to an embodiment of the present invention for configuring a data storage device by comparing configuration data records of a parameter file to configuration execution records of an executable file.

FIG. 1C illustrates a method according to an embodiment of the present invention wherein configuration data records of a parameter file 2 are compared (step 4) to configuration execution records of an executable file 6. The configuration execution records are for configuring at least one configuration file of a disk drive. If the configuration data records interlock with the configuration execution records, the configuration file is modified (step 8) and the modified configuration file is stored to the disk drive (step 10). The method may be performed by a computer external to the disk drive, or by control circuitry internal to the disk drive, or a combination of both. Also, although a disk drive is discussed for illustrative purposes, embodiments of the present invention may include other data storage devices, such as solid state drives, flash memory, optical data storage devices (e.g., CD-ROM), etc.

In the embodiment of FIG. 1C, the parameter file 2 may be referred to as a 0x115 file and the executable file 6 may be referred to as a 0x118 file. Also in the embodiment of FIG. 1C, the configuration data records may be generated using a graphical user interface (GUI) (step 12). The resulting 0x115 file is evaluated by firmware design engineers who implement the corresponding 0x118 file that will configure the disk drive. In an embodiment described below with reference to FIGS. 4A and 4B, the 0x118 file is implemented as a ".h" file which is interpreted in order to configure the disk drive as specified by a 0x115 file generated using the GUI (step 12).

FIG. 2 shows an example GUI for generating the configuration data records (0x115 records) of the parameter file (0x115 file). In the example shown, there are a number of configurable features, wherein each feature may have one or more parameters. Each parameter may be one of a plurality of types, such as a Boolean type, a value type, an enumerated type, or a string type. The GUI may display the configuration settings for a number of different configurations, for example, for a number of different customers (e.g., PC manufacturers). In one embodiment, the GUI protects against invalid user input. For example, the GUI may provide only two possible values for a Boolean type (true or false), or the GUI may limit the possible settings for a value type. Similarly, an enumerated type may be restricted to only the values that may be selected from a drop-down menu as illustrated in FIG. 2. A string value (e.g., the firmware version parameter) may be limited by a minimum and/or maximum number of characters for the string.

FIG. 3A shows an example format for a configuration data record (a 0x115 record), and FIG. 3B shows an example format for a configuration execution record (a 0x118 record). The 0x115 record comprises a signature field which stores a special value that demarks the beginning of the record within the 0x115 file. The feature ID identifies the feature number, and the parameter ID identifies the parameter number. The parameter type may be any suitable value (e.g., Boolean, value, enumerated, string, etc.), and the parameter length specifies the byte length of the parameter value. The length of the parameter value may vary, for example, if the parameter type is string. Since the parameter value has a variable length, the signature field identifies the beginning of each 0x115 record in the 0x115 file.

In one embodiment, the common fields between a 0x115 record are compared to the 0x118 records in order to determine whether the 0x115 record interlocks with one of the 0x118 records. The parameter value of the 0x115 record may also be compared to a feature enabled field of the 0x118 record. In one embodiment, there must be a match between all of the interlock fields in order to find an interlocking record. If an interlock is found, the remaining fields of the 0x118 record specify how to modify the configuration file of the disk drive in order to implement the requested configuration. In the example of FIG. 3B, the fields of a 0x118 record include an actual length field which specifies the actual length (bits or bytes) to modify in the configuration file. A file section field, file offset field, and bit number field specify the exact location within the configuration file to modify. In addition, certain 0x115 records may correspond to multiple 0x118 records that modify multiple settings of a configuration file (e.g., multiple bits). In this embodiment, the 0x118 records further include a settings_per_feature field and a setting_no field which specify the total number of settings and the setting number being configured for a particular 0x118 record.

The 0x118 records may be implemented in any suitable manner, and in an embodiment illustrated in FIGS. 4A and 4B, the 0x118 records are implemented as a table defined in a ".h" file. The first four entries in the table of FIG. 4A correspond to an ATA security setting. The feature ID is one, the parameter ID is one, and the type is Boolean indicating the ATA security feature is either enabled or disabled. The feature enabled field specifies either "ENABLE" or "DISABLE", followed by three fields which specify the location within the configuration file to modify. In this example, there are two bits that are configured (set or reset) and therefore there are two corresponding table entries. When a 0x115 record is received to configure this feature, all of the corresponding fields must match, including whether to ENABLE or DISABLE the feature. When a match is found, the configuration file is modified as specified by the two table entries of the matching 0x118 record.

The second feature in FIG. 4A corresponds to an offline scan of the disk drive. This feature has a first Boolean parameter to enable/disable the feature, and a second value parameter (a timer) that specifies how long the disk drive must remain idle before beginning (or continuing) the offline scan. Since the timer is of type value, the expected_value field of the 0x118 record is set to UNRELATED since there is no expected value. The bit_number field of the 0x118 record is also set to UNRELATED since the value modifies one or more bytes.

FIG. 4B illustrates an enumerated parameter (the second parameter of the AAM feature) wherein there are three possible values for the enumerated value (see the example of FIG. 2). For each of the three possible values, a byte in the configuration file is modified with a particular bit pattern. In other words, the byte in the configuration file can only take on three possible values as defined by the 0x118 record, and these three values correspond to the only possible selections provided in the drop-down menu of the GUI in FIG. 2. When a match between a 0x115 record and the 0x118 record is found, there will be a match of all seven table entries shown in FIG. 4B, and therefore all seven table entries will be processed in order to configure the corresponding byte of the configuration file. The last feature in FIG. 4B corresponds to a firmware version which comprises a Boolean parameter indicating whether the feature is enabled, and a string value for specifying the version number (see FIG. 2). Similar to a value type, with a string type the expected_value of the corresponding 0x118 record is set to UNRELATED since there is no expected value for a string type.

Figure 5:
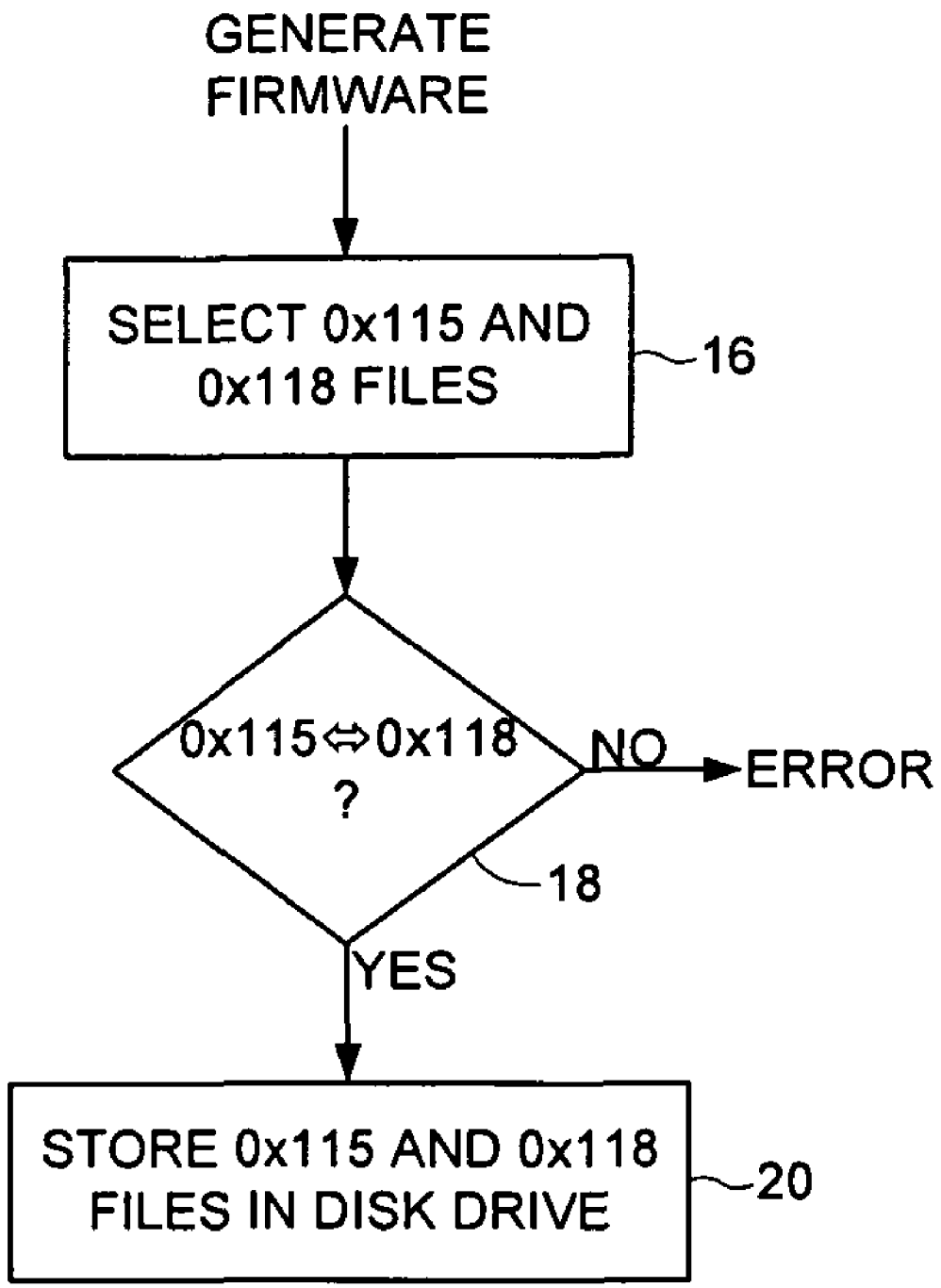
FIG. 5 is a flow diagram according to an embodiment of the present invention wherein the configuration execution records are integrated with firmware and then interlock checked with configuration data records prior to loading the firmware and configuration data records to the disk drive.

FIG. 5 is a flow diagram according to an embodiment of the present invention wherein when generating a new firmware version that is to be downloaded into a disk drive, a 0x115 file and a 0x118 file is selected (step 16). For example, an engineer may select from a database an executable file that includes a 0x118 file, and then select from the database a 0x115 file. The 0x115 records of the 0x115 file are then compared to the 0x118 records of the 0x118 file to ensure that all of the 0x115 records interlock with a corresponding 0x118 record (step 18). If not, an error is generated and the firmware is not downloaded into the disk drive. Otherwise, the firmware (including the 0x115 and 0x118 files) are downloaded into the disk drive (step 20).

Figure 6:
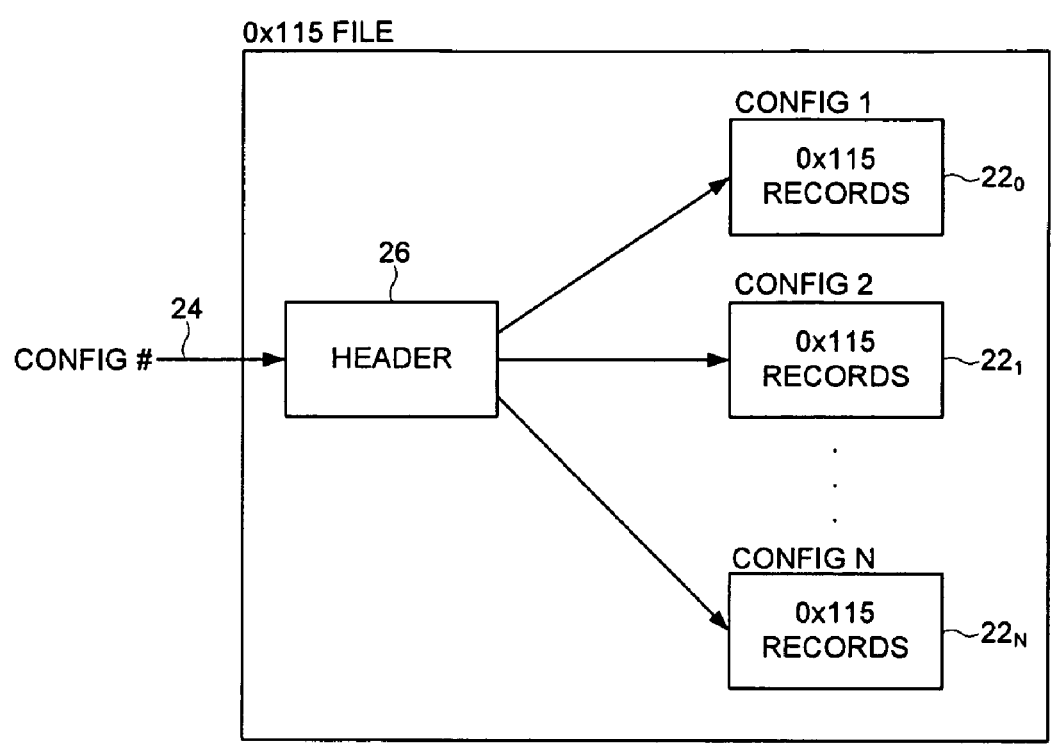
FIG. 6 shows an embodiment of the present invention wherein a configuration data file stores a plurality of configuration data record sets each corresponding to a particular configuration for the disk drive.

FIG. 6 shows an embodiment of the present invention wherein the 0x115 file comprises a plurality of 0x115 record sets $22_0$-$22_N$, wherein each 0x115 record set $22_i$ corresponds to a particular configuration (e.g., for a particular customer). A configuration code 24 is received by the disk drive which indexes a header structure 26 that is used to select the corresponding 0x115 record set. This embodiment enables a single firmware version (including 0x115 file and 0x118 file) to be downloaded into a disk drive, and then to configure the disk drive into a desired state. For example, the disk drive may be configured into various states in order to perform various manufacturing test procedures, and then configured into a final state corresponding to a particular customer (e.g., a PC manufacturers).

In one embodiment, the configuration code 24 comprises multiple codes, such as a first code that specifies a hardware configuration of the data storage device (described in greater detail below with reference to FIG. 10), and a second code that specifies a configuration for a particular customer. For example, the first code may specify a number of disks, size of a cache memory, shock/drop sensors, etc., and the second code may specify a particular customer configuration for the corresponding hardware configuration.

Figure 7A:
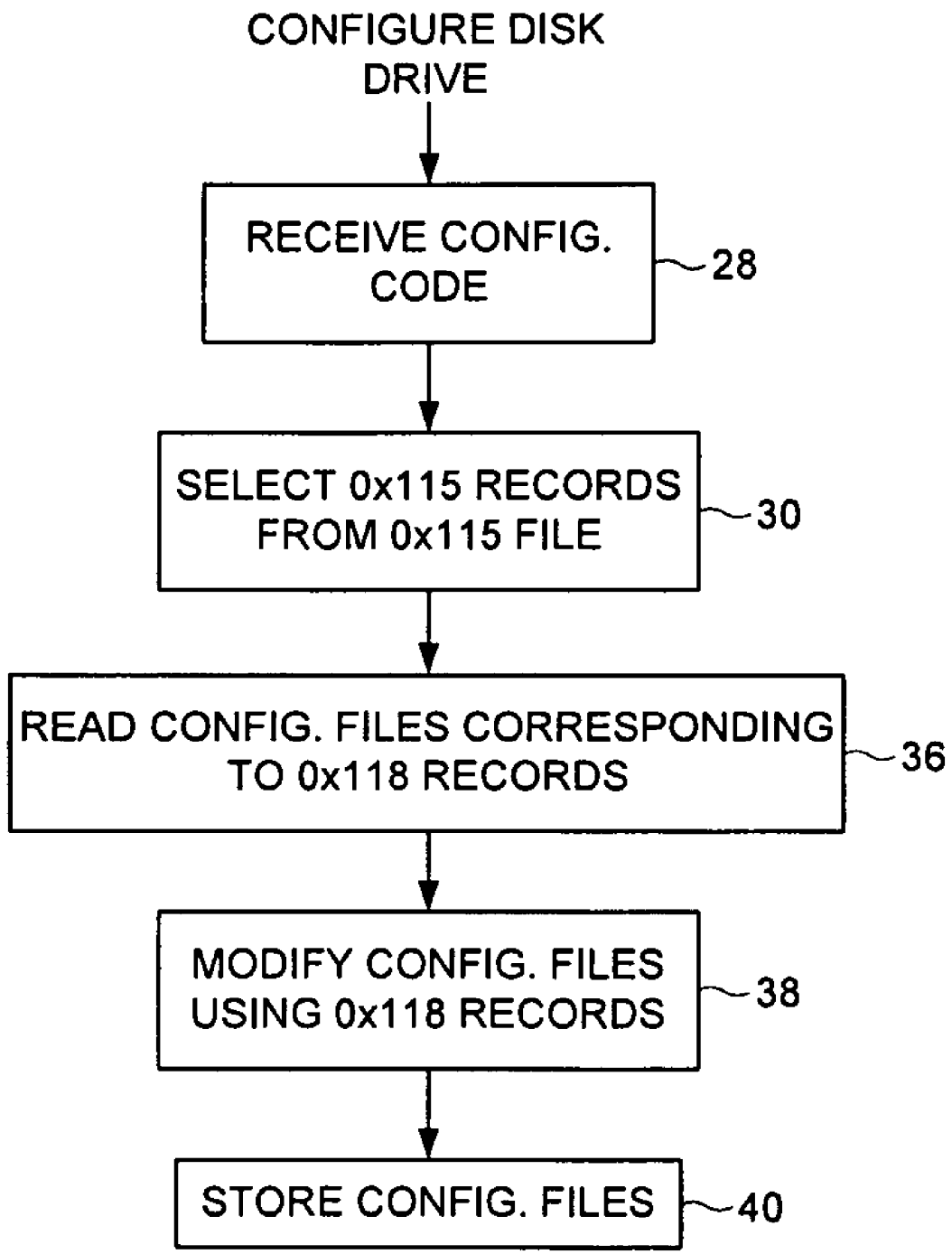
FIG. 7A shows an embodiment of the present invention wherein in response to a configuration code a disk drive configures at least one configuration file with a selected configuration data record set.

FIG. 7A shows a flow diagram according to an embodiment of the present invention wherein when configuring a disk drive, a configuration code is received by the disk drive (step 28) and a corresponding 0x115 record set is selected from the 0x115 file (step 30). The configuration file (or files) corresponding to the matching 0x118 records are read (step 36), modified using the matching 0x118 records (step 38), and then stored back to the disk drive (step 40). The configuration files may be stored in any suitable manner, such as in a non-volatile semiconductor memory (e.g., a flash memory), and one or more of the configuration files may also be stored on the disk of the disk drive.

Figure 7B:
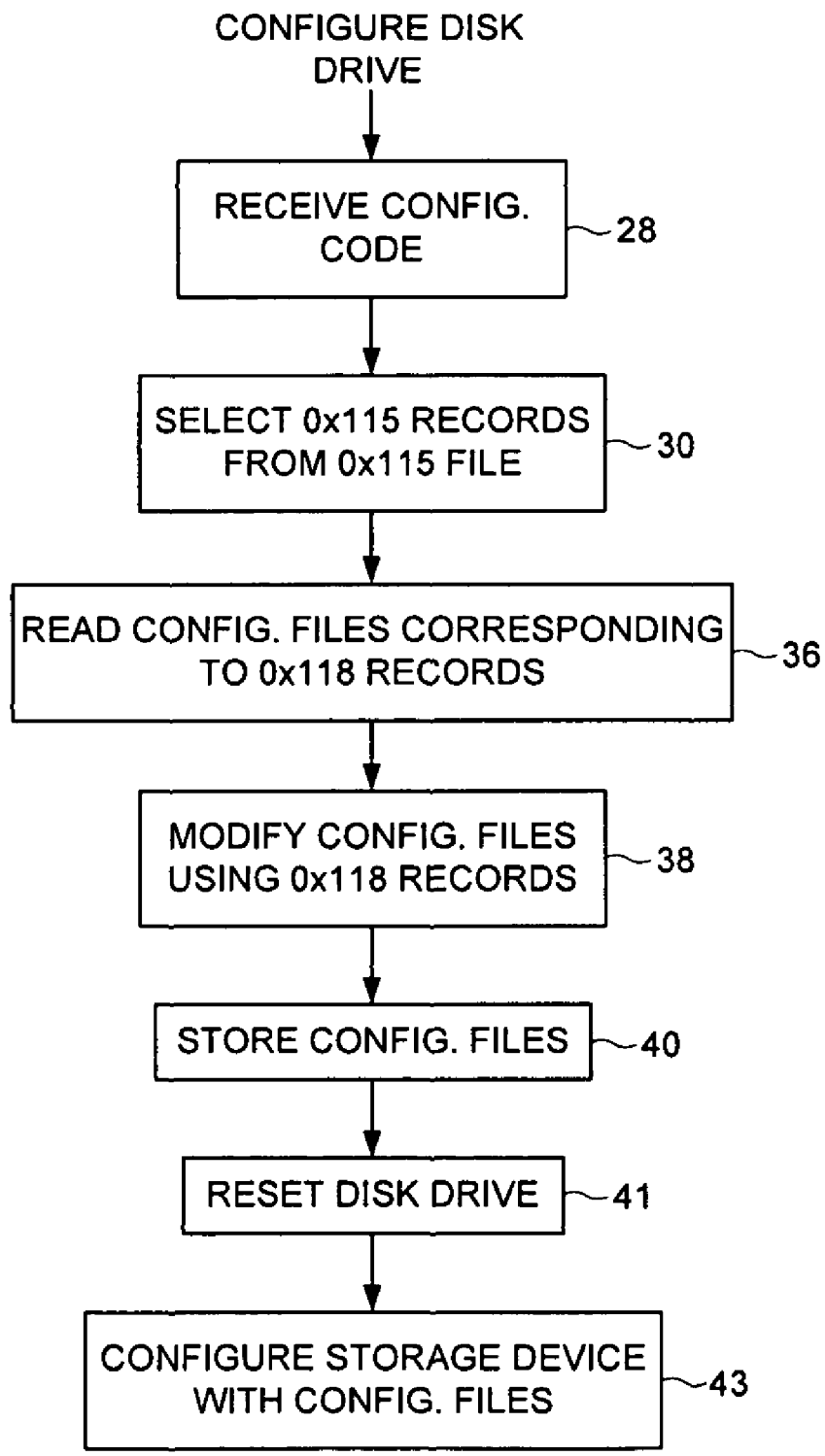
FIG. 7B shows an embodiment of the present invention wherein after modifying configuration files with the selected configuration data record set, the disk drive is reset in order to reconfigure the disk drive.

FIG. 7B is a flow diagram which expands on the flow diagram of FIG. 7A, wherein after the configuration file (or files) are stored back to the disk drive, the disk drive is reset (step 41) in order to configure the disk drive with the modified configuration files (step 43). Resetting the disk drive may comprise a full reboot of the disk drive (e.g., a power cycle reboot), or a partial reboot of the disk drive. In this embodiment, configuration parameters read from the configuration file(s) are modified in non-volatile memory while the firmware is executing based on the previous parameters stored in a volatile semiconductor memory. The modified configuration parameters do not affect the operation of the disk drive until the disk drive is reset so that the parameters are reconfigured in an atomic operation.

Figure 8A:
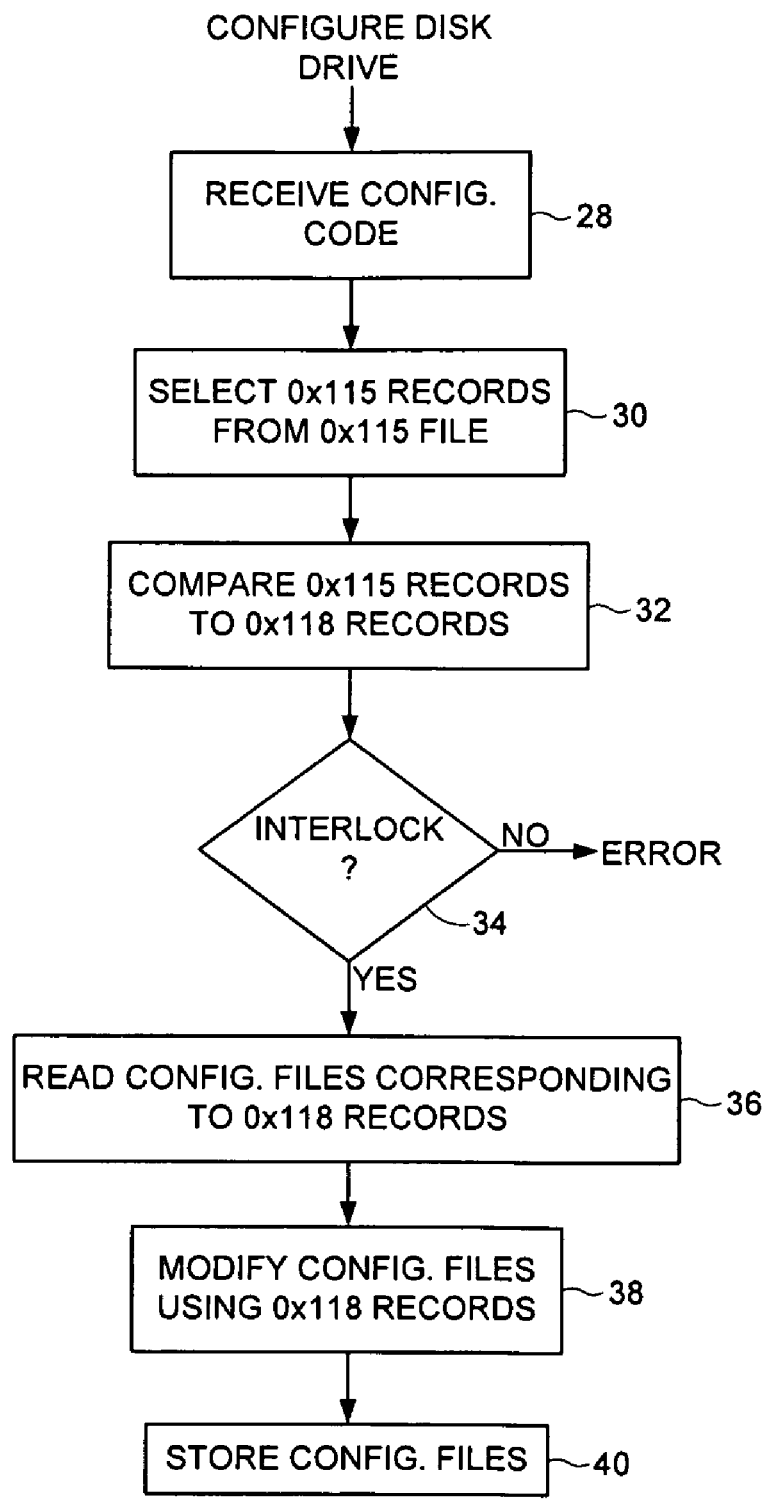
FIG. 8A is a flow diagram according to an embodiment of the present invention wherein the control circuitry within the disk drive performs an interlock check on a selected configuration data record set.

FIG. 8A is a flow diagram which expands on the flow diagram of FIG. 7A, wherein the selected 0x115 records are compared to the 0x118 records (step 32) and if a match is found (interlock) for all of the 0x115 records (step 34), then the configuration file (or files) corresponding to the matching 0x118 records are read (step 36), modified using the matching 0x118 records (step 38), and then stored back to the disk drive (step 40).

Figure 8B:
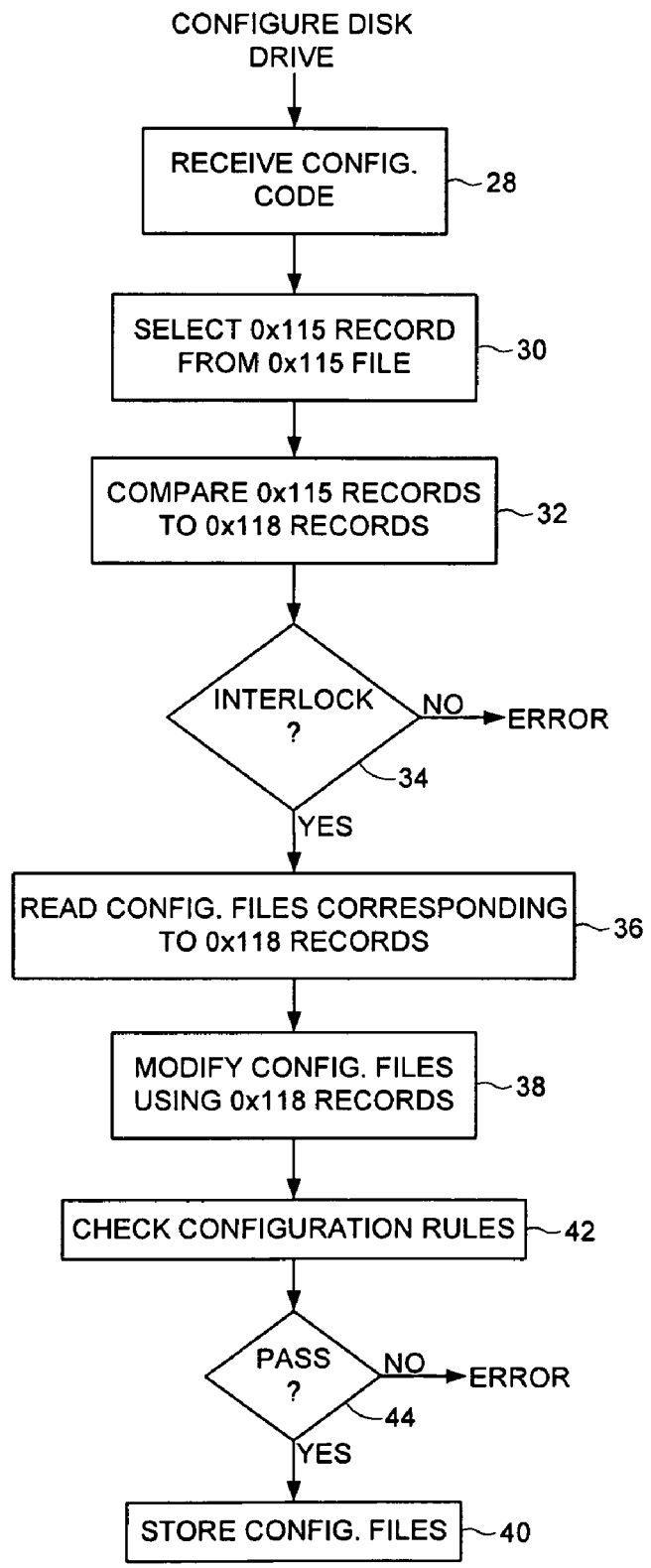
FIG. 8B is a flow diagram according to an embodiment of the present invention wherein the control circuitry within the disk drive checks configuration rules for a selected configuration data record set.

FIG. 8B is a flow diagram which expands on the flow diagram of FIG. 8A, wherein after modifying the configuration files (step 38), a number of configuration rules are checked (step 42) in order to verify the validity of the configuration. Any suitable configuration rule may be checked, such as a dependency check wherein a first parameter may be set to a selected value only if one or more other parameters are set to predetermined values. In another embodiment, the configuration rules comprise an exclusivity check wherein if a first parameter is enabled, one or more other parameters must be disabled. Yet another configuration rule may comprise a range check wherein a parameter value must fall within a predetermined range. The configuration rules checked at step 42 may comprise any combination of dependency, exclusivity, and range checking rules.

Figure 9:
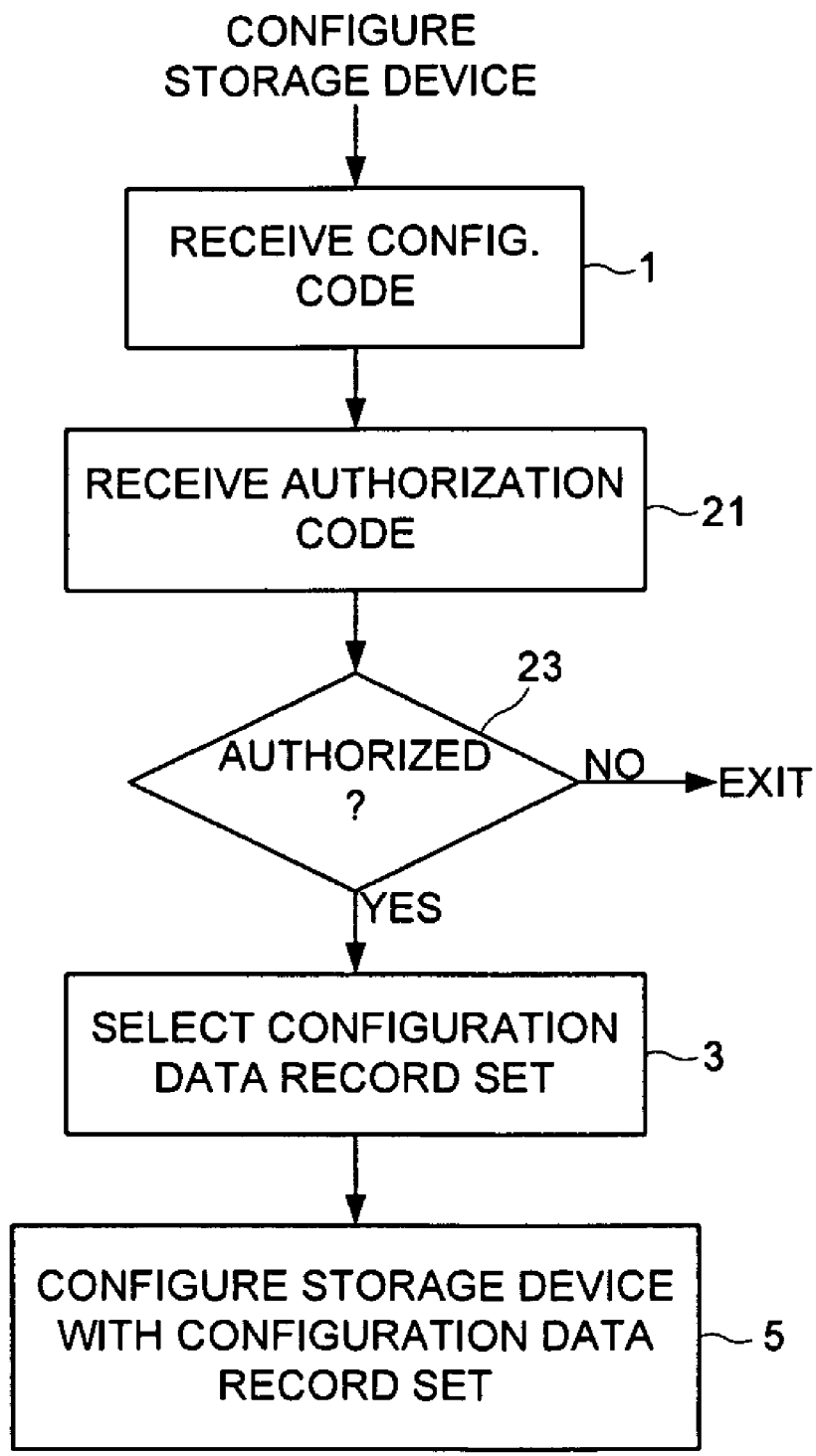
FIG. 9 is a flow diagram according to an embodiment of the present invention wherein the data storage device receives an authorization code for authorizing the configuration code prior to configuring the data storage device.

FIG. 9 is a flow diagram which expands on the flow diagram of FIG. 1A wherein the data storage device receives an authorization code for authorizing the configuration code (step 21). If the configuration code is authorized (step 23), then the configuration data record set is selected (step 3) and the data storage device is configured (step 5). The authorization code may be implemented using any suitable security algorithm, such as a simple password or a more sophisticated cipher. In one embodiment, the security algorithm may include a unique ID (e.g., a serial number) hard-wired or hard-coded into each individual data storage device.

Figure 10:
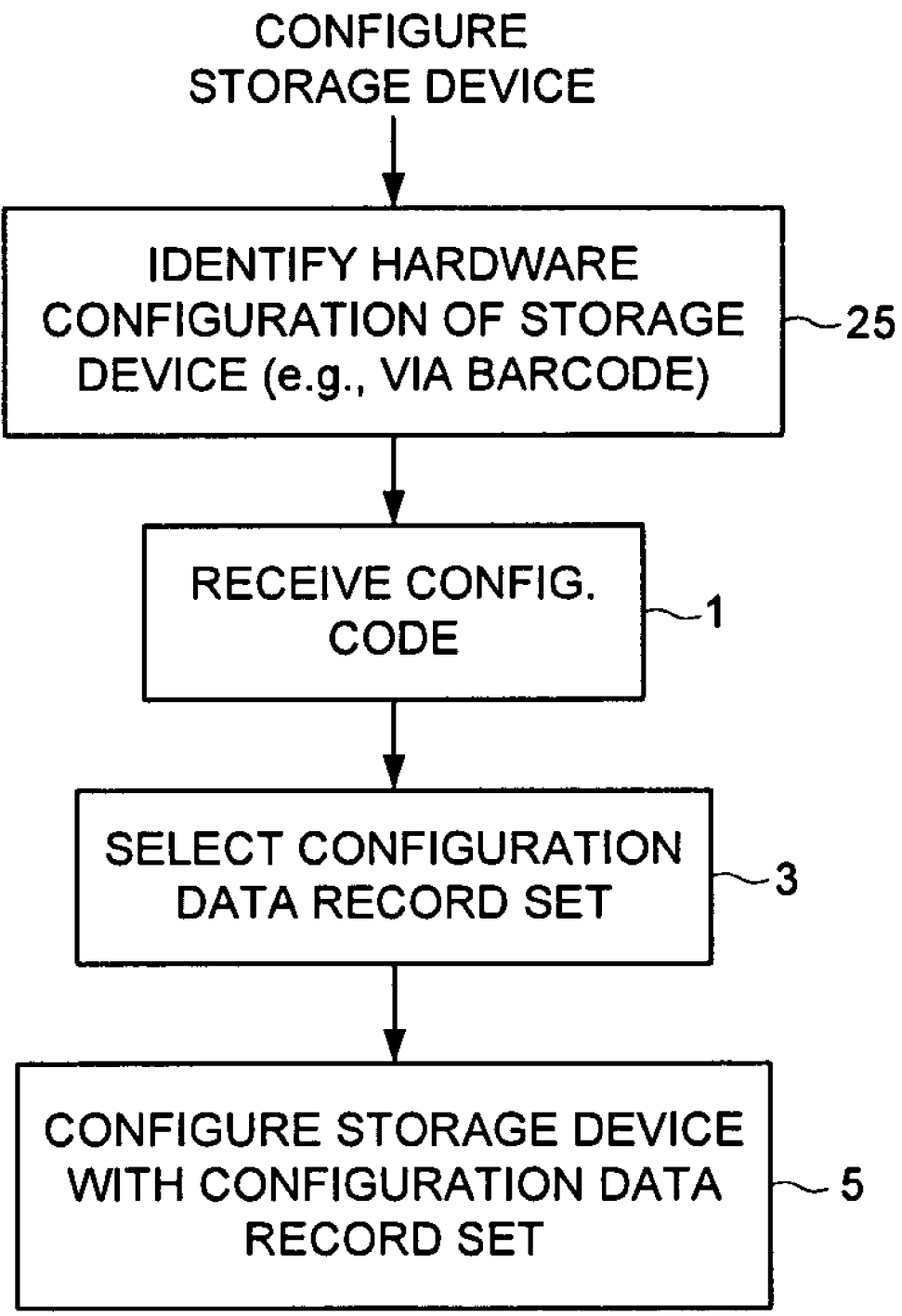
FIG. 10 is a flow diagram according to an embodiment of the present invention wherein the configuration code configures the firmware based on a hardware configuration of the data storage device.

FIG. 10 is a flow diagram according to an embodiment of the present invention wherein a hardware configuration is identified for the data storage device (step 25), and then the configuration code is transmitted to the data storage device based on the identified hardware configuration (step 1). For example, after the data storage device is manufactured, a suitable technique is used to identify the hardware configuration, such as by reading a barcode printed on a label adhered to the data storage device. The data storage device may be manufactured with any suitable hardware configuration, such as a selected number of disks, a selected size of a cache memory, with or without shock and/or drop sensors, etc. In this embodiment, a single version of the firmware may be installed into the data storage device capable of supporting multiple hardware configurations. The configuration code is then used to configure the firmware of the data storage device by selecting the configuration data record set corresponding to its hardware configuration.

Figure 11:
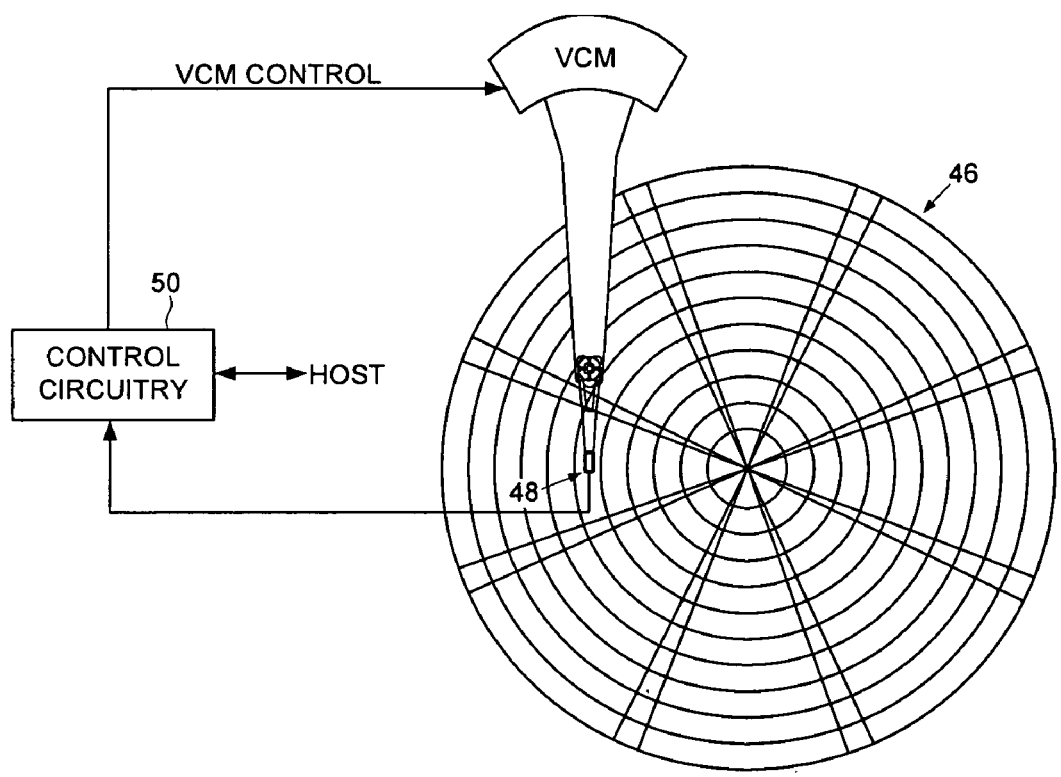
FIG. 11 shows a disk drive according to an embodiment of the present invention comprising a disk, a head actuated over the disk, and control circuitry for configuring the disk drive.

FIG. 11 shows a disk drive according to an embodiment of the present invention comprising a disk 46, a head 48 actuated over the disk 46, and control circuitry 50 operable to communicate with a host. The control circuitry is further operable to configure the disk drive in response to a configuration code, and in one embodiment, by comparing configuration data records (0x115 records) of a parameter file to configuration execution records (0x118 records) of an executable file, wherein the configuration execution records for configuring at least one configuration file of a disk drive. If the configuration data records interlock with the configuration execution records, the control circuitry 50 modifies the configuration file and stores the modified configuration file to the disk drive.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A method of configuring a data storage device comprising:
   receiving a configuration code;
   selecting a configuration data record set from a plurality of configuration data record sets in response to the configuration code, wherein each configuration data record set comprises a plurality of feature parameter settings;
   configuring the data storage device with the selected configuration data record set;
   receiving a first configuration code for configuring the data storage device into a manufacturing test procedure mode; and
   receiving a second configuration code for configuring the data storage device into a customer specific operating mode.

2. The method as recited in claim 1, wherein the feature parameter settings comprise a security parameter.

3. The method as recited in claim 1, wherein the feature parameter settings comprise an off-line scan parameter.

4. The method as recited in claim 1, wherein the feature parameter settings comprise an acoustic management parameter.

5. The method as recited in claim 1, wherein the data storage device comprises a disk, further comprising formatting the disk to comprise a selected tracks per inch (TPI) prior to receiving the second configuration code.

6. The method as recited in claim 1, wherein the plurality of configuration data record sets are stored in at least one configuration file.

7. The method as recited in claim 1, further comprising resetting the data storage device in order to configure the data storage device with the selected configuration data record set.

8. The method as recited in claim 1, wherein control circuitry within the data storage device receives the configuration code and selects the configuration data record set.

9. The method as recited in claim 1, further comprising receiving an authorization code for authorizing the configuration code prior to configuring the data storage device.

10. The method as recited in claim 1, further comprising identifying a hardware configuration of the data storage device, wherein the configuration code corresponds to the identified hardware configuration.

11. A data storage device comprising control circuitry configured to:
    receive a configuration code;
    select a configuration data record set from a plurality of configuration data record sets in response to the configuration code, wherein each configuration data record set comprises a plurality of feature parameter settings;
    configure the data storage device with the selected configuration data record set;
    receive a first configuration code for configuring the data storage device into a manufacturing test procedure mode; and
    receive a second configuration code for configuring the data storage device into a customer specific operating mode.

12. The data storage device as recited in claim 11, wherein the feature parameter settings comprise a security parameter.

13. The data storage device as recited in claim 11, wherein the feature parameter settings comprise an off-line scan parameter.

14. The data storage device as recited in claim 11, wherein the feature parameter settings comprise an acoustic management parameter.

15. The data storage device as recited in claim 11, wherein the data storage device comprises a disk, and the control circuitry is further configured to format the disk to comprise a selected tracks per inch (TPI) prior to receiving the second configuration code.

16. The data storage device as recited in claim 11, wherein the plurality of configuration data record sets are stored in at least one configuration file.

17. The data storage device as recited in claim 11, wherein the control circuitry is further configured to reset the data storage device in order to configure the data storage device with the selected configuration data record set.

18. The data storage device as recited in claim 11, wherein the control circuitry is further configured to receive an authorization code for authorizing the configuration code prior to configuring the data storage device.

* * * * *